(12) United States Patent
Savalle et al.

(10) Patent No.: US 10,700,984 B2
(45) Date of Patent: Jun. 30, 2020

(54) DIFFERENTIATING DEVICES WITH SIMILAR NETWORK FOOTPRINTS USING ACTIVE TECHNIQUES

(71) Applicant: Cisco Technology, Inc., San Jose, CA (US)

(72) Inventors: Pierre-André Savalle, Rueil-Malmaison (FR); Jean-Philippe Vasseur, Saint Martin d'uriage (FR); Grégory Mermoud, Veyras (CH)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/194,449

(22) Filed: Nov. 19, 2018

(65) Prior Publication Data

US 2020/0162391 A1    May 21, 2020

(51) Int. Cl.
*H04L 12/715*   (2013.01)
*H04L 12/851*   (2013.01)
*H04L 12/26*    (2006.01)
*H04L 29/06*    (2006.01)

(52) U.S. Cl.
CPC ........ *H04L 47/2441* (2013.01); *H04L 43/028* (2013.01); *H04L 43/0876* (2013.01); *H04L 45/46* (2013.01); *H04L 63/0245* (2013.01)

(58) Field of Classification Search
None
See application file for complete search history.

(56) References Cited

U.S. PATENT DOCUMENTS

| | | | |
|---|---|---|---|
| 8,694,630 B1 * | 4/2014 | Keralapura | H04L 47/2441 709/223 |
| 8,799,456 B2 | 8/2014 | de Jager et al. | |
| 9,298,494 B2 | 3/2016 | Gathala et al. | |
| 10,440,577 B1 * | 10/2019 | Vasseur | H04W 48/02 |
| 2013/0148513 A1 * | 6/2013 | Szabo | H04L 41/142 370/252 |

(Continued)

OTHER PUBLICATIONS

Drasar, et al., "Similarity as a central approach to flow-based anomaly detection", International Journal of Network Management, 24, pp. 318-336, 2014, John Wiley & Sons, Ltd.

(Continued)

*Primary Examiner* — Ajit Patel
(74) *Attorney, Agent, or Firm* — Behmke Innovation Group LLC; James M. Behmke; Jonathon P. Western

(57) ABSTRACT

In one embodiment, a labeling service receives traffic feature data for a cluster of endpoint devices in a network. A device classification service forms the cluster of endpoint devices by applying machine learning-based clustering to the feature data. The labeling service selects a subset of the endpoint devices in the cluster, in an effort to maximize diversity of the traffic feature data of the selected endpoint devices. The labeling service sends a control command into the network, to trigger a traffic behavior by the selected subset. The labeling service receives updated traffic feature data for the selected subset associated with the triggered traffic behavior. The labeling service controls whether a label request is sent to a user interface for labeling of the cluster of endpoint devices with a device type, based on the updated traffic feature data for the subset of endpoint devices in the cluster.

20 Claims, 9 Drawing Sheets

(56) References Cited

U.S. PATENT DOCUMENTS

| | | |
|---|---|---|
| 2017/0083920 A1 | 3/2017 | Zoldi et al. |
| 2017/0279829 A1 | 9/2017 | Vasseur et al. |
| 2018/0006961 A1* | 1/2018 | Guibene ............... H04W 40/04 |
| 2018/0227176 A1 | 8/2018 | Ponnuswamy |
| 2018/0278629 A1* | 9/2018 | McGrew ................ G06N 20/00 |
| 2018/0375887 A1* | 12/2018 | Dezent ................ H04L 63/1425 |

OTHER PUBLICATIONS

Lear et al. "Manufacturer Usage Description Specification draft-ietf-opsawg-mud-20" Network Working Group; Apr. 9, 2018; pp. 1-58.

http://en.wikipedia.org/wiki/Determinantal_point_process; Determinantal point process—Wikipedia; pp. 1-4.

European Search Report dated Jan. 22, 2020 in connection with European Application No. 19208541.

* cited by examiner

DIFFERENTIATING DEVICES WITH SIMILAR NETWORK FOOTPRINTS USING ACTIVE TECHNIQUES

TECHNICAL FIELD

The present disclosure relates generally to computer networks, and, more particularly, to differentiating devices with similar network footprints using active techniques.

BACKGROUND

An emerging area of interest in the field of computer networking is the "Internet of Things" (IoT), which may be used by those in the art to refer to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, window shades and blinds, doors, locks, etc.

As more non-traditional devices join the IoT, networks may eventually evolve from a bring-your-own-device (BYOD) model to a model that enables bring-your-own-thing (BYOT), bring-your-own-interface (BYOI), and/or bring-your-own-service (BYOS) paradigms. In other words, as the IoT grows, the number of available services, etc., will also grow considerably. For example, a single person in the future may transport sensor-equipped clothing, other portable electronic devices (e.g., cell phones, etc.), cameras, pedometers, or the like, into an enterprise environment, each of which may attempt to access the wealth of new IoT services that are available on the network.

From a networking perspective, the network can automatically configure access control policies, other security policies, and the like, if the device type of a particular IoT device is known to the network. For example, the network may limit a particular type of sensor to only communicating with its supervisory. However, with the ever-increasing number and variety of IoT devices, it may also be the case that the device type is not initially known to the network.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
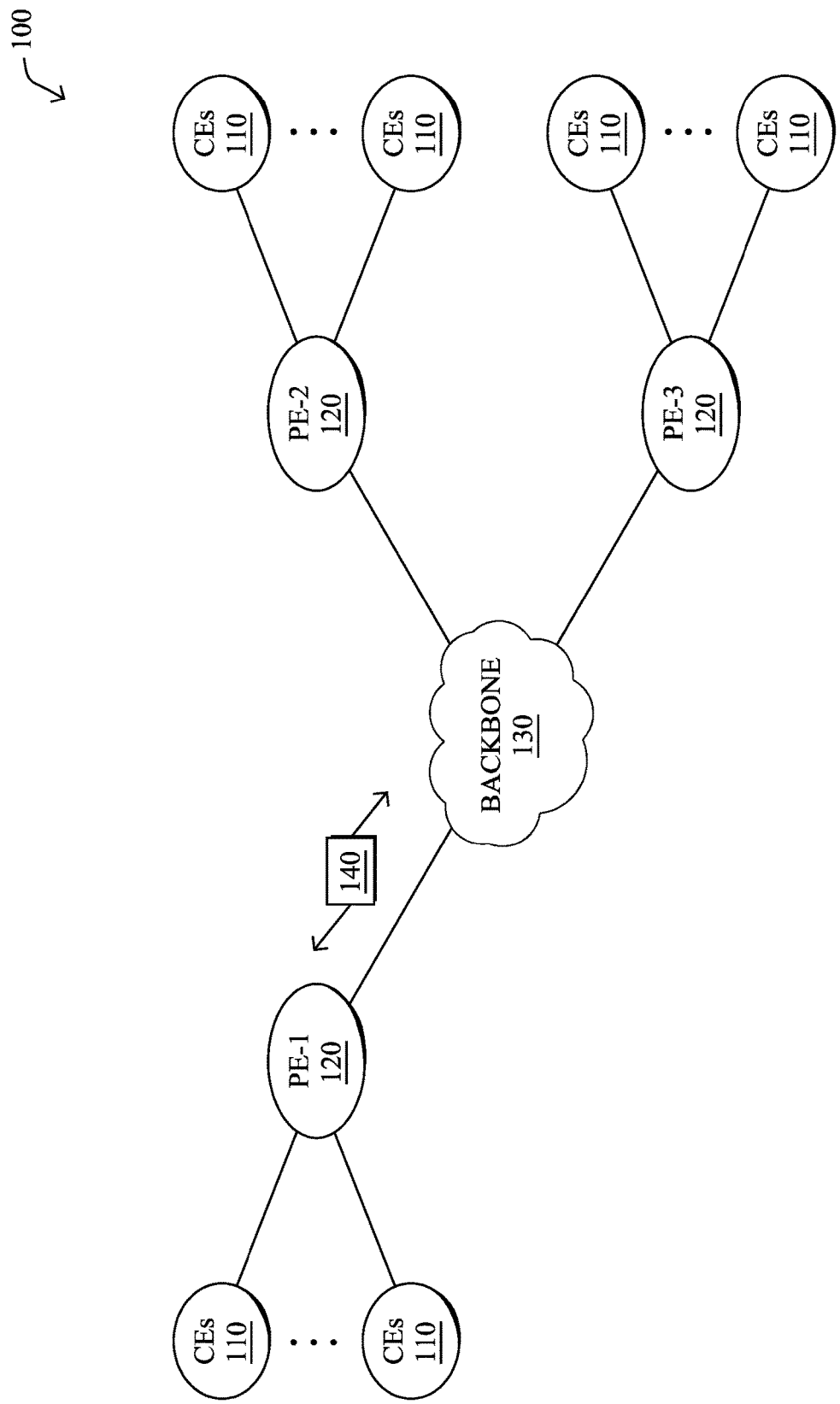
FIGS. 1A-1B illustrate an example communication network.

According to one or more embodiments of the disclosure, a labeling service receives traffic feature data for a cluster of endpoint devices in a network. A device classification service forms the cluster of endpoint devices by applying machine learning-based clustering to the feature data. The labeling service selects a subset of the endpoint devices in the cluster, in an effort to maximize diversity of the traffic feature data of the selected endpoint devices. The labeling service sends a control command into the network, to trigger a traffic behavior by the selected subset. The labeling service receives updated traffic feature data for the selected subset associated with the triggered traffic behavior. The labeling service controls whether a label request is sent to a user interface for labeling of the cluster of endpoint devices with a device type, based on the updated traffic feature data for the subset of endpoint devices in the cluster.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different service providers), with potentially a backup link (e.g., a 3G/4G/LTE connection). A site of type B may itself be of different types:

2a.) Site Type B1: a site connected to the network using two MPLS VPN links (e.g., from different service providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
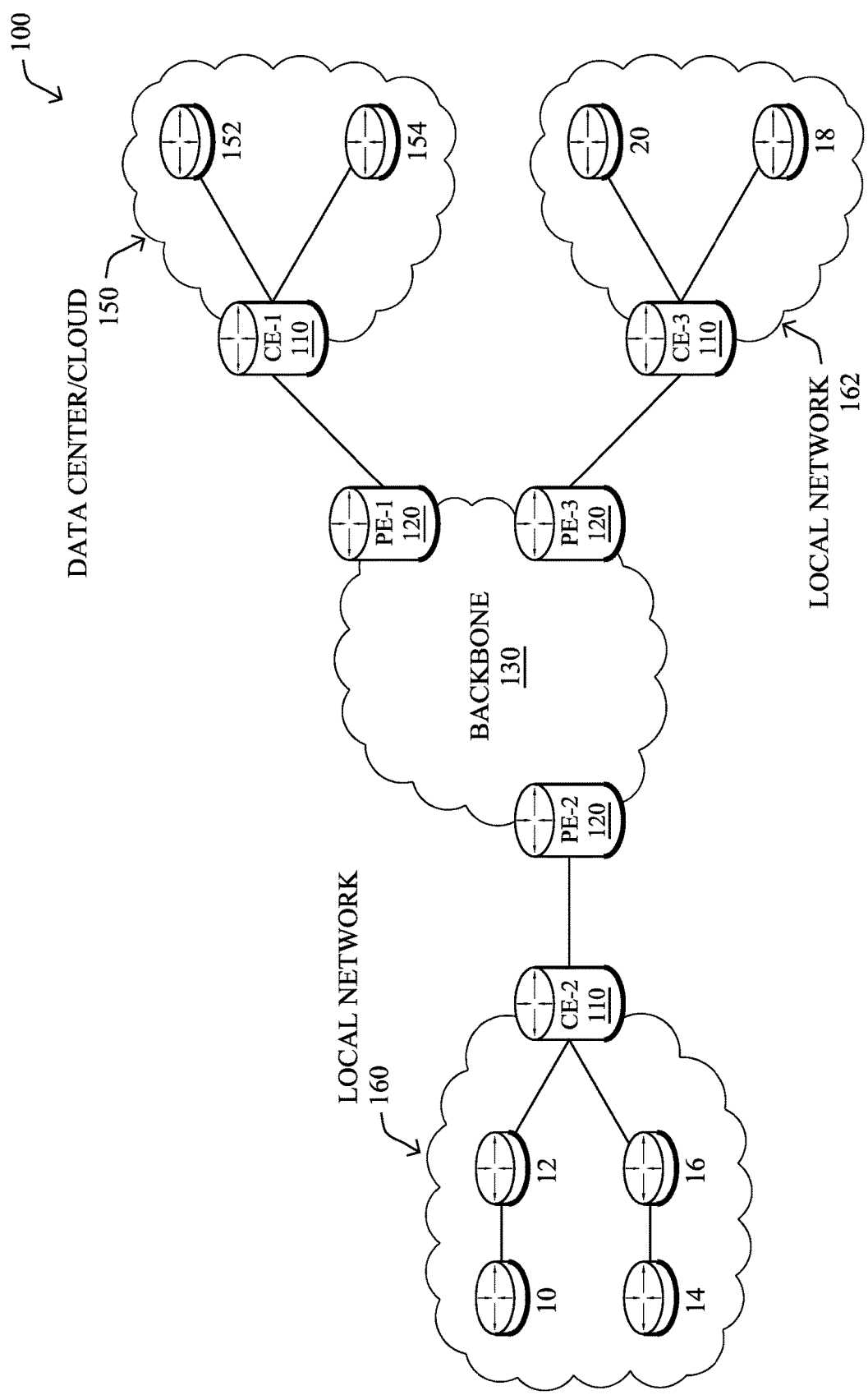

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
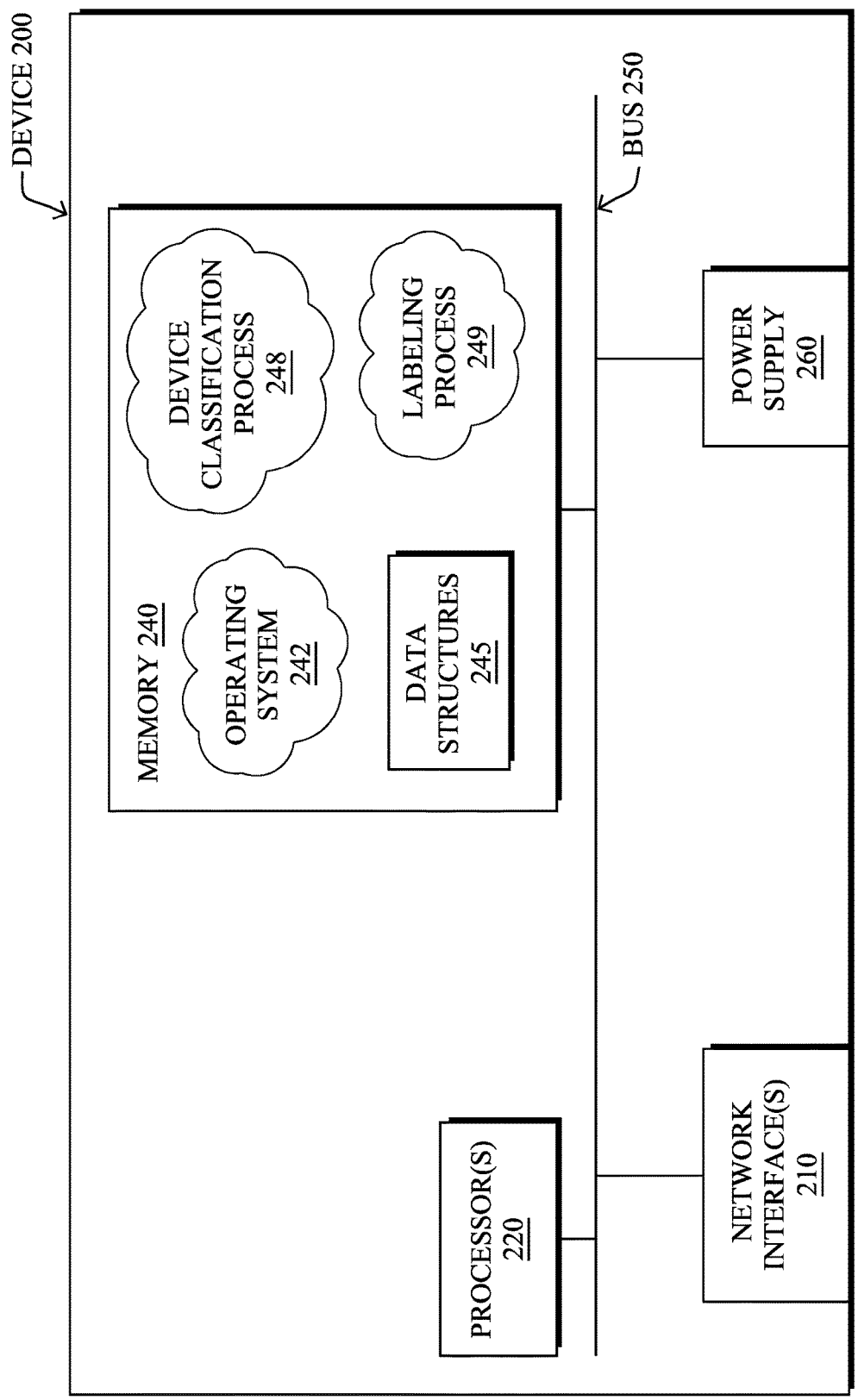
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154

(e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a device classification process 248 and/or a labeling process 249, as detailed below.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, device classification process 248 may execute one or more machine learning-based classifiers to classify a device in a network, based on its corresponding network traffic. In one embodiment, device classification process 248 may assess captured telemetry data regarding one or more traffic flows involving the device, to determine the device type associated with the device. In further embodiments, device classification process 248 may classify the operating system of the device, based on its captured traffic telemetry data.

Device classification process 248 may employ any number of machine learning techniques, to classify the gathered telemetry data and apply a device type label to a device associated with the traffic. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, device classification process 248 can use the model M to classify new data points, such as information regarding new traffic flows in the network. Often, M is a statistical model, and the cost function is inversely proportional to the likelihood of M, given the input data.

In various embodiments, device classification process 248 may employ one or more supervised, unsupervised, or semi-supervised machine learning models. Generally, supervised learning entails the use of a training set of data, as noted above, that is used to train the model to apply labels to the input data. For example, the training data may include sample telemetry data that is labeled as "iPhone 6," or "iOS 10.2." On the other end of the spectrum are unsupervised techniques that do not require a training set of labels. Notably, while a supervised learning model may look for previously seen patterns that have been labeled as such, an unsupervised model may attempt to analyze the data without applying a label to it. For example, supervised learning can be used to cluster devices that behave similarly to one another, based on their captured telemetry data. Semi-supervised learning models take a middle ground approach that uses a greatly reduced set of labeled training data.

Example machine learning techniques that device classification process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of traffic flows that are incorrectly classified as associated with a particular device type (e.g., make and/or model number, operating system, etc.). Conversely, the false negatives of the model may refer to the number of traffic flows that the model incorrectly classifies as belonging to a certain device type. True negatives and positives may refer to the number of traffic flows that the model correctly classifies as not being of a certain class or being of a certain class, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In some cases, device classification process 248 may assess the captured telemetry data on a per-flow basis. In other embodiments, device classification process 248 may assess telemetry data for a plurality of traffic flows based on any number of different conditions. For example, traffic flows may be grouped based on their sources, destinations, temporal characteristics (e.g., flows that occur around the same time or within the same time window, etc.), combinations thereof, or based on any other set of flow characteristics.

Figure 3:
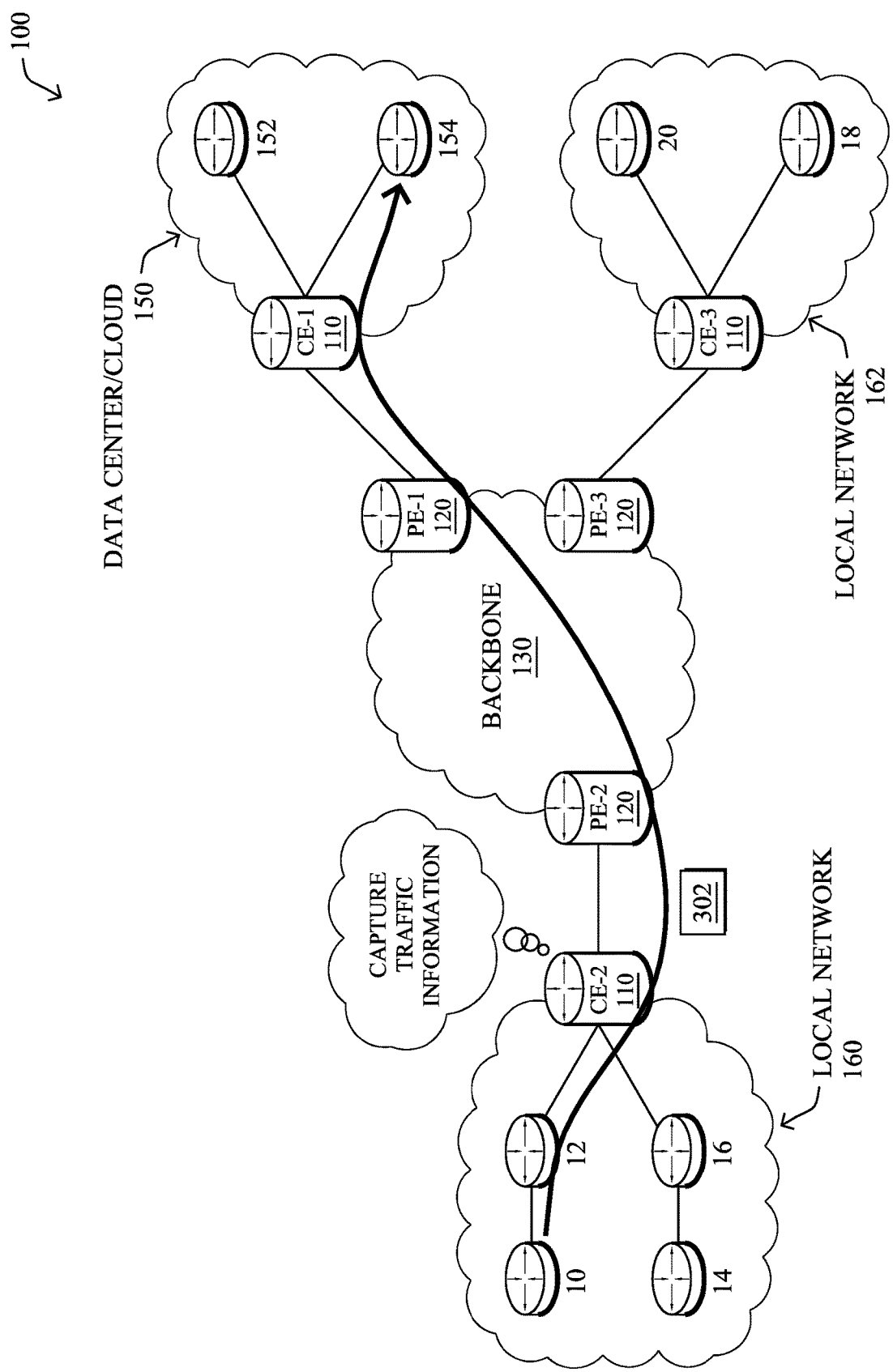
FIG. 3 illustrates an example of the capture of traffic telemetry data.

As shown in FIG. 3, various mechanisms can be leveraged to capture information about traffic in a network, such as telemetry data regarding a traffic flow. For example, consider the case in which client node 10 initiates a traffic flow with remote server 154 that includes any number of packets 302. Any number of networking devices along the path of the flow may analyze and assess packet 302, to capture telemetry data regarding the traffic flow. For example, as shown, consider the case of edge router CE-2 through which the traffic between node 10 and server 154 flows.

In some embodiments, a networking device may analyze packet headers, to capture feature information about the traffic flow. For example, router CE-2 may capture the source address and/or port of host node 10, the destination address and/or port of server 154, the protocol(s) used by packet 302, the hostname of server 154, and/or other header information by analyzing the header of a packet 302. Example captured features may include, but are not limited to, Transport Layer Security (TLS) information (e.g., from a TLS handshake), such as the ciphersuite offered, User Agent information, destination hostname, TLS extensions, etc., HTTP information (e.g., URI, etc.), Domain Name System (DNS) information, ApplicationID, virtual LAN (VLAN) ID, or any other data features that can be extracted from the observed traffic flow(s). Further information, if available could also include process hash information from the process on host node 10 that participates in the traffic flow.

In further embodiments, the device may also assess the payload of the packet to capture information about the traffic flow. For example, router CE-2 or another device may perform deep packet inspection (DPI) on one or more of packets 302, to assess the contents of the packet. Doing so may, for example, yield additional information that can be used to determine the application associated with the traffic flow (e.g., packets 302 were sent by a web browser of node 10, packets 302 were sent by a videoconferencing application, etc.).

The networking device that captures the flow telemetry data may also compute any number of statistics or metrics regarding the traffic flow. For example, CE-2 may determine the start time, end time, duration, packet size(s), the distribution of bytes within a flow, etc., associated with the traffic flow by observing packets 302.

As noted above, with the proliferation of IoT devices and the bring-your-own-device (BYOD) approach, it is very difficult for an administrator to provide detailed information about each device connected to the network, such as its device type (e.g., printer, iPhone, tablet, iOS 10 device, etc.). Because of the dynamic nature of modern networks, this type of information is not static and cannot be handled manually. However, such detailed information may be needed for proper assessment of security incidents involving a particular device, to apply a network access policy to the device, for purposes of traffic shaping of traffic involving the device, and other network operations.

Figure 4:
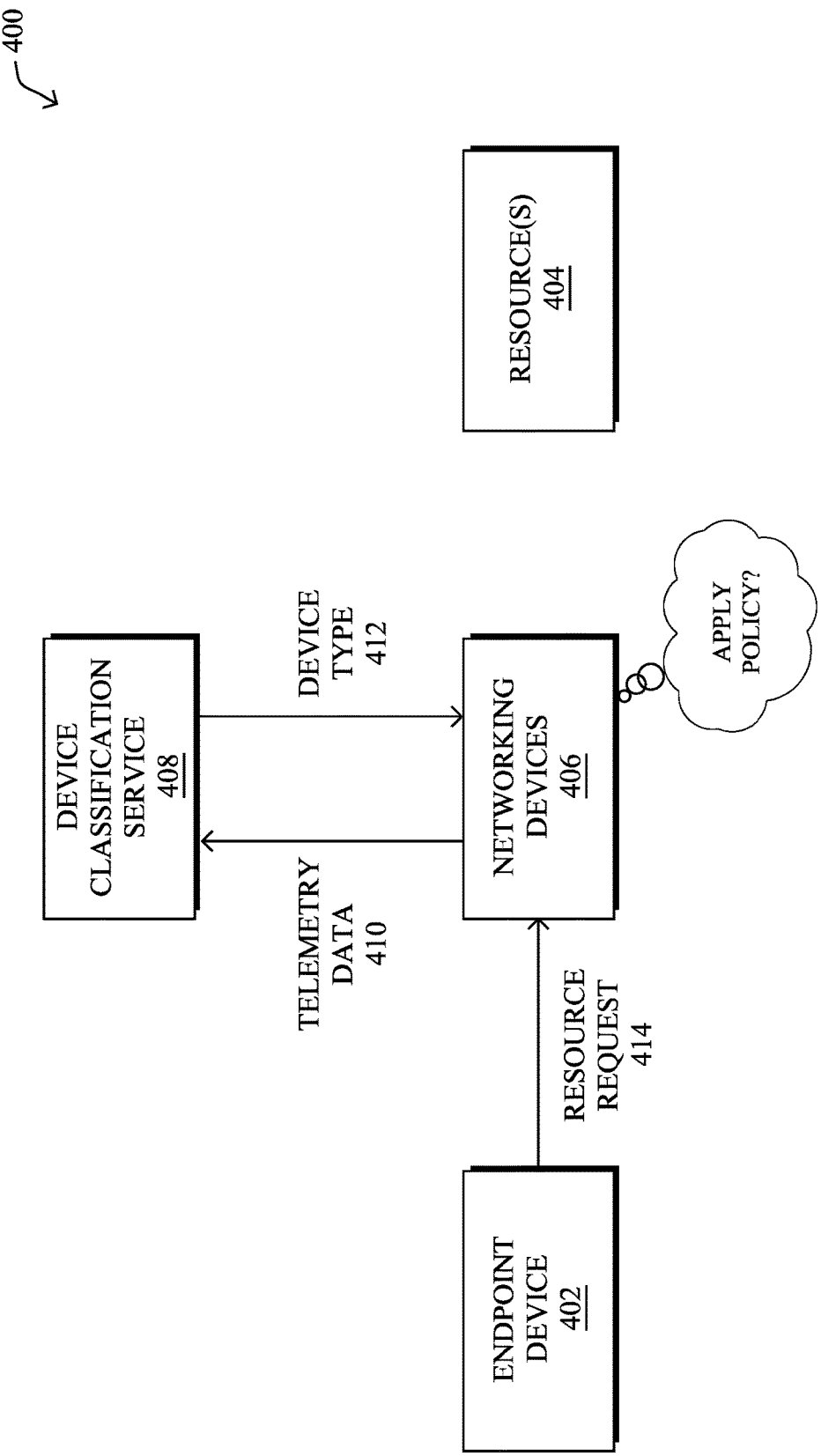
FIG. 4 illustrates an example of a device classification service in a network.

FIG. 4 illustrates an example of a device classification service in a network, in various embodiments. As shown, network 400 may generally include an endpoint device 402 (e.g., a user device, a sensor, an actuator, etc.), any number of resources 404, and any number of networking devices 406 that are configured to provide connectivity between endpoint device 402 and resource(s) 404. For example, networking devices 406 may include access points, wireless LAN controllers (WLCs), switches, routers, security devices (e.g., firewalls, etc.), access points (APs), and the like. Network resources 404 may include cloud-based services, specific servers or other endpoints, webpages, or any other resource with which endpoint device 402 could communicate.

Also as shown in FIG. 4 is a device classification service 408 that may be hosted on one or more of networking devices 406 or be in communication therewith. In general, device classification service 408 is configured to take as input telemetry data 410 captured by networking device 406 regarding network traffic associated with endpoint device 402 and, based on the captured telemetry, identify the device type 412 of endpoint device 402. For example, device type 412 may indicate the operating system (e.g., iOS, Android, etc.), manufacturer (e.g., Apple, Samsung, etc.), make (e.g., iPhone, etc.), model (e.g., 5s, 6, 7, etc.), function (e.g., thermostat, temperature sensor, etc.), or any other information that can be used to categorize endpoint device 402.

Note that the classification of endpoint device 402 by device classification service 408 can also, in some embodiments, be of varying specificity, depending on the telemetry data 410 available to service 408 and/or its degree of confidence in a particular classification. For example, device classification service 408 may determine, with a high degree of confidence, that endpoint device 402 is an Apple iPhone, but may or may not be able to determine whether device 402 is an iPhone 5s or an iPhone 6. Accordingly, in some embodiments, service 408 may also return the confidence values for the classification label(s) in device type 412 to networking device 406.

The labeling of endpoint device 402 with a device type 412 by device classification service 408 may initiate enforcement of one or more network policies by networking device 406 with respect to endpoint device 402. Such network policies may include, but are not limited to, security policies, network traffic or quality of service (QoS) policies, access polices, and the like. For example, as shown, assume that endpoint device 402 sends out a resource request 414 for a particular one of resources 404. In turn, networking devices 406 may determine whether to allow or block resource request 414 from reaching its target resource 404, based on the policy associated with the determined device type 412 of endpoint device 402. For example, if endpoint device 402 is determined to be a smart thermostat, it may be prevented from accessing certain online resources, such as an email service. Similarly, if endpoint device 402 is determined to be a safety-related sensor, a traffic or QoS policy associated with device type 412 may cause networking devices 406 to assign a higher priority to traffic from endpoint device 402.

In general, device classification (also known as "device profiling") to identify the device type of a device under scrutiny has traditionally used static rules and heuristics for the determination. In further embodiments, the device classification can be achieved by applying a trained machine learning-based classifier to the captured telemetry data for an endpoint device. Such telemetry can also take the form of information captured through active and/or passive probing of endpoint devices, to assign a device type and corresponding host profile to a device. Notably, this probing may entail sending any or all of the following probes:

DHCP probes with helper addresses

SPAN probes, to get messages in INIT-REBOOT and SELECTING states, use of ARP cache for IP/MAC binding, etc.

Netflow probes

HTTP probes to obtain information such as the OS of the device, Web browser information, etc.

RADIUS probes

SNMP to retrieve MIB object or receives traps

DNS probes to get the Fully Qualified Domain Name (FQDN)

etc.

A device classification service may even trigger active scanning of the network and SNMP scanning when the default community string is set to public. This can be done, for example, to retrieve the MAC address of the device or other types of information. Such a variety to probes allows for the gathering of a rich set of information that can be used for device profiling. A degree of confidence can also be assigned to any such device type classifications. Note also that the device profiling can be performed at multiple points in the network, such as by wireless LAN controllers (WLCs) in addition to, or in lieu of, a centralized service.

In many networks, the number of devices that fall into the 'UNKNOWN' device type category has been found to be as high as 40%. In other words, up to 40% of the devices on a given network may not match any existing device profiling rules in use. This is expected to grow over time, illustrating the need for a more dynamic device profiling approach. Indeed, it is estimated that the number of endpoint devices will reach 3.6 billion by 2021.

As noted above, a device classification service may leverage machine learning to label endpoint devices in a network with device types. Preliminary testing has shown that machine learning is particularly well suited for this purpose, as the classifier is able to label new endpoint devices, if their behaviors are similar to those of previously labeled endpoint devices. For example, the device type classifier may include a multi-class classification model such as a decisions tree based model (e.g., a random forest, etc.) trained using telemetry samples labeled with the known device types of their associated endpoint devices. In further cases, the device type classifier may leverage a machine learning-based clustering approach that uses the traffic telemetry data as input and attempts to group similarly behaving devices by their network traffic behaviors. The classifier can then propagate the device type labels of known endpoint devices to other endpoint devices in their behavioral clusters. For example, if an endpoint device under scrutiny belongs to a particular behavioral cluster based on its traffic telemetry, and that cluster includes one or more endpoint devices known to have a particular device type, the endpoint device under scrutiny can also be labeled with that device type.

While machine learning is potentially quite powerful for purposes of performing device type classifications, such approaches also require a set of labeled examples on which the classifications are to be based. In some cases, the device classification service can use active learning whereby experts are asked to provide labels for groups of endpoint devices labeled by the classifier as 'UNKNOWN,' so that the classifier can learn new device behaviors over time. One limitation of this approach is that for the labeling to be effective, groups need to be as homogeneous as possible and actually consist of multiple endpoints corresponding to a single device type. In some contexts, the network traffic and characteristics available may be too limited to assess this correctly:

As noted, the device classification service may attempt to collect data from various sources in the network such as, but not limited to, RADIUS, policy and security systems, Netflow, port scanners, deep packet inspection (DPI) from various protocols (e.g., DNS, DHCP, HTTP, specialized protocols, etc.), and any other source that can provide telemetry data regarding an endpoint device. Although this can lead to very rich descriptions of the devices, it is very common for only a handful of sources to be configured for a given system. This may be due to technical limitations, or simply due to oversight or misconfiguration. Missing data sources lead to representations that as not as rich, and that may not be able to differentiate different device types so clearly.

More generally, traffic passively extracted from network traffic may not be sufficient to correctly differentiate all types of devices. Protocols observed may be more indicative of a certain class of device than of a particular endpoint type.

In other words, active learning of labels is susceptible to mislabeling the behaviors of some endpoint devices due to a lack of sufficient features. For example, an iPhone may inadvertently be included in a group of iPads for which labeling is needed, due to a lack of sufficient features to distinguish between the two. In such a case, labeling of the group could inadvertently lead to misclassifications of iPhones having similar behavioral profiles as that of the labeled example in the group.

Differentiating Devices with Similar Network Footprints Using Active Techniques

The techniques herein introduce a method for screening candidate groups of endpoint devices that are appearing close to identical, from a behavioral standpoint, using a given feature representation. In some aspects, the techniques herein allow selected members of the group to be exposed to stimuli and situations, so as to force the endpoint devices to reveal more about their behaviors. In doing so, this allows the system to determine whether the endpoint devices in the group are indeed of one unique device type, or whether they differ in more subtle characteristics than originally available. In further aspects, the additional information can be used to refine the clustering of the devices in the group, as well as to improve the device classification service and its classification abilities, directly, using a control loop mechanism.

Specifically, according to one or more embodiments of the disclosure as described in detail below, a labeling service receives traffic feature data for a cluster of endpoint devices in a network. A device classification service forms the cluster of endpoint devices by applying machine learning-based clustering to the feature data. The labeling service selects a subset of the endpoint devices in the cluster, in an effort to maximize diversity of the traffic feature data of the selected endpoint devices. The labeling service sends a control command into the network, to trigger a traffic behavior by the selected subset. The labeling service receives updated traffic feature data for the selected subset associated with the triggered traffic behavior. The labeling service controls whether a label request is sent to a user interface for labeling of the cluster of endpoint devices with a device type, based on the updated traffic feature data for the subset of endpoint devices in the cluster.

Illustratively, the techniques described herein may be performed by hardware, software, and/or firmware, such as in accordance with the labeling process 249, which may include computer executable instructions executed by the processor 220 (or independent processor of interfaces 210) to perform functions relating to the techniques described herein, e.g., in conjunction with device classification process 248.

Figure 5:
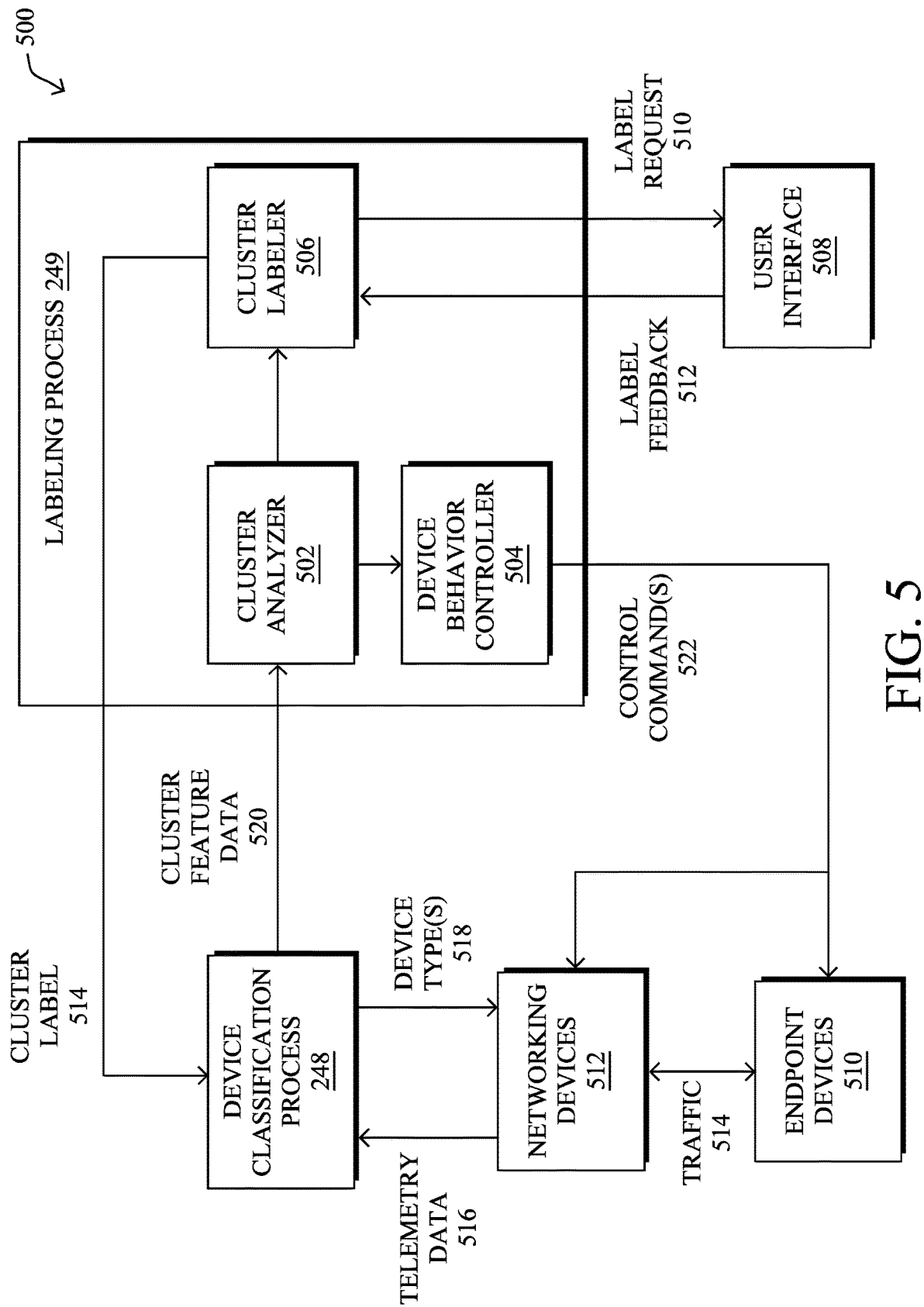
FIG. 5 illustrates an example architecture for differentiating devices with similar network footprints using active techniques.

Operationally, FIG. 5 illustrates an example architecture for differentiating devices with similar network footprints using active techniques. As shown, labeling process 249 may operate in conjunction with device classification process 248 to provide label data 514 for a cluster of endpoint devices to device classification process 248 for purposes of training and/or updating the machine learning-based device type classifier(s) of device classification process 248. In various embodiments, architecture 500 may include a cluster analyzer 502, a device behavior controller 504, a cluster labeler 506 and/or a user interface 508. These components 502-508 may be implemented in a distributed manner or implemented on a single device. In addition, some or all of components 502-508 may be implemented as part of a monitored network (e.g., on networking devices 512) or part of a cloud-based device classification service. The functionalities of the components of architecture 500 may also be combined, omitted, or implemented as part of other processes, as desired.

As shown, assume that networking devices 512 in one or more networks observe traffic 514 associated with any number of endpoint device 510 located in their networks. In turn, networking devices 512 may provide traffic telemetry data 516 to device classification process 248, which may provide a device classification service in the network(s). Based on telemetry data 516, device classification process 248 may classify endpoint devices 510 and return their device type(s) 518 to networking devices 512, thereby allowing the receiving devices 512 to apply network policies to endpoint devices 510 based on their device types. For example, one such network policy may cause networking devices 512 to prevent an MRI machine in endpoint devices 510 from accessing the Internet via the network.

In various embodiments, labeling process 249 may operate in conjunction with device classification process 248 to implement an active learning control loop. For example, assume that device classification process 248 uses machine learning-based clustering to group similarly behaving endpoint devices 510, but is unable to classify the cluster with sufficient confidence, leading to these devices being labeled as 'UNKNOWN.' In such a case, device classification service 248 may send cluster feature data 520 to labeling process 249, to seek out a device type label via user interface 508. For example, cluster labeler 506 of labeling process 249 may send a label request 510 to user interface 508 and, in response, obtain label feedback 512. In turn, cluster labeler 506 may provide back to device classification process 248 as a cluster label 514 for the cluster associated with cluster feature data 520. By doing so, device classification process 248 can use the cluster label 514 to update its classifier, accordingly.

The above active learning approach can be used not only to label cluster of 'UNKNOWN' endpoint devices 510, but also to label clusters of endpoint devices driven by their associated degrees of criticality. Various criteria can be used to determine the criticality of the endpoint devices such as. For example, the protocol(s) used by those unknown devices may reveal that these devices are quite critical, thus requiring active techniques such as the one described hereafter, or an Index of Compromise (IoC) indicative of device with suspicious activities. In other words, in some cases, clusters can be prioritized for labeling via active learning, based on their associated measures of criticality.

As noted, however, blindly sending label request 510 to the user of user interface 508 can also lead to misclassifications over time, particularly when device classification service 248 incorrectly groups endpoint devices 510 of different device types into a single cluster. Typically, this may be due to telemetry data 516 regarding the traffic of these devices lacking sufficient features to distinguish the devices of the two types.

According to various embodiments, labeling process 249 may include cluster analyzer 502 that is configured to communicate with device classification process 248 and obtain cluster feature data 520 for a cluster of endpoint devices, either on a pull or push basis. In some cases, cluster feature data 520 may take the form of feature vectors that summarize the network traffic and characteristics of the endpoint devices in the cluster.

FIG. 5 illustrates an example set 600 of telemetry feature vectors 604 for endpoint devices in a network. In general, each feature vector 604 may be associated with a specific endpoint device and include information regarding any number of potential traffic features 602 that may be observed in the traffic for that endpoint device. For example, each dimension of a feature vector 604 may represent the presence or absence of a certain protocol such as, but not limited to, IPv6, IPv4, IGMPv3, IGMPv2, ICMPv6, ICMP, HTTP/XML, HTTP, etc. In some cases, entries in a feature vector 604 may be on a binary basis, to indicate whether a given protocol was seen in the traffic of the endpoint device or not. In other cases, entries in a feature vector 604 may be more complex, such as assigning a weighting for each feature 602 based on the frequency at which that feature was observed in the traffic of the endpoint device or on any other criteria as desired.

Figure 6:
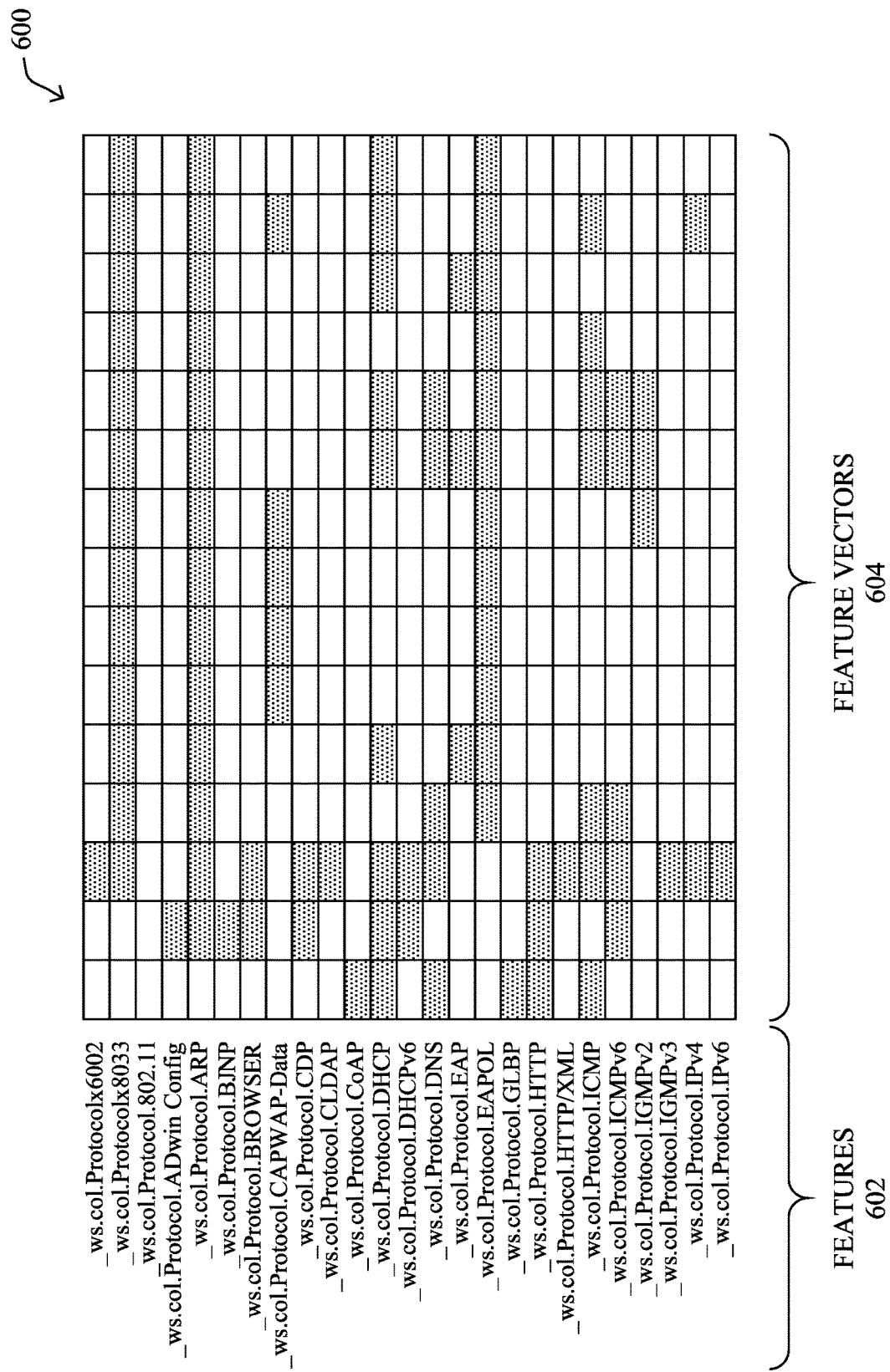
FIG. 6 illustrates an example set of traffic feature vectors.

By way of example, consider the first three feature vectors 604 in FIG. 6. As shown, entries in feature vectors 604 include binary indications as to whether a given feature 602 was observed in the traffic for their associated endpoint devices. In particular a shaded entry in feature vectors 604 indicates the presence of the corresponding feature 602 in the traffic of that endpoint device, while an empty entry indicate the absence of that feature in the traffic. For example, the first three feature vectors in feature vectors 604 indicate that their corresponding endpoint devices do not exhibit any 802.11 or EAPOL protocol activity and are likely from a wired lab. Some devices represented by feature vectors 504 correspond to a CAPWAP packet trace, leading to similar artifacts. V6 protocols are also sometimes present in feature vectors 604, although not always.

Referring again to FIG. 5, cluster analyzer 502 may select a subset of endpoint devices in the cluster for which device classification process 248 provided cluster feature data 520 to cluster analyzer 502. In various embodiments, the goal of this selection is to select a limited number of endpoint devices in the cluster, to confirm whether the endpoint devices in the cluster are indeed of the same device type. More specifically, cluster analyzer 502 may utilize a diversity-based method to select a few devices from the cluster for further analysis. Note that a typical cluster of endpoint devices 510 may include dozens, hundreds, or even thousands of endpoint devices 510. This type of approach samples points from the cluster, in an attempt to maximize the dissimilarity between the feature data (e.g., feature vectors) of the selected points/devices.

Cluster analyzer 502 may use any number of different approaches, to perform the diversity sampling of the cluster, based on the cluster feature data 520 of the cluster. For example, cluster analyzer 502 may use any of the following, to select a subset of endpoint devices from the cluster:

Greedy selection of the furthest away point from all previously selected points, or based on other submodular set functions.

Probabilistic point processes, such as determinantal point processes, which are statistical models over sets where the likelihood of a set is proportional to the volume spanned by the feature vectors corresponding to the elements in the set. Unlike greedy selection, these probabilistic objects can be sampled all at once, obtaining one set of points/devices in a single step.

Dynamic methods, such as clustering with k-medoids, where one point of the group is selected to represent each cluster. Although this does not directly model a notion of diversity, it does so implicitly by estimating a set of clusters that cover the full group.

Figure 7:
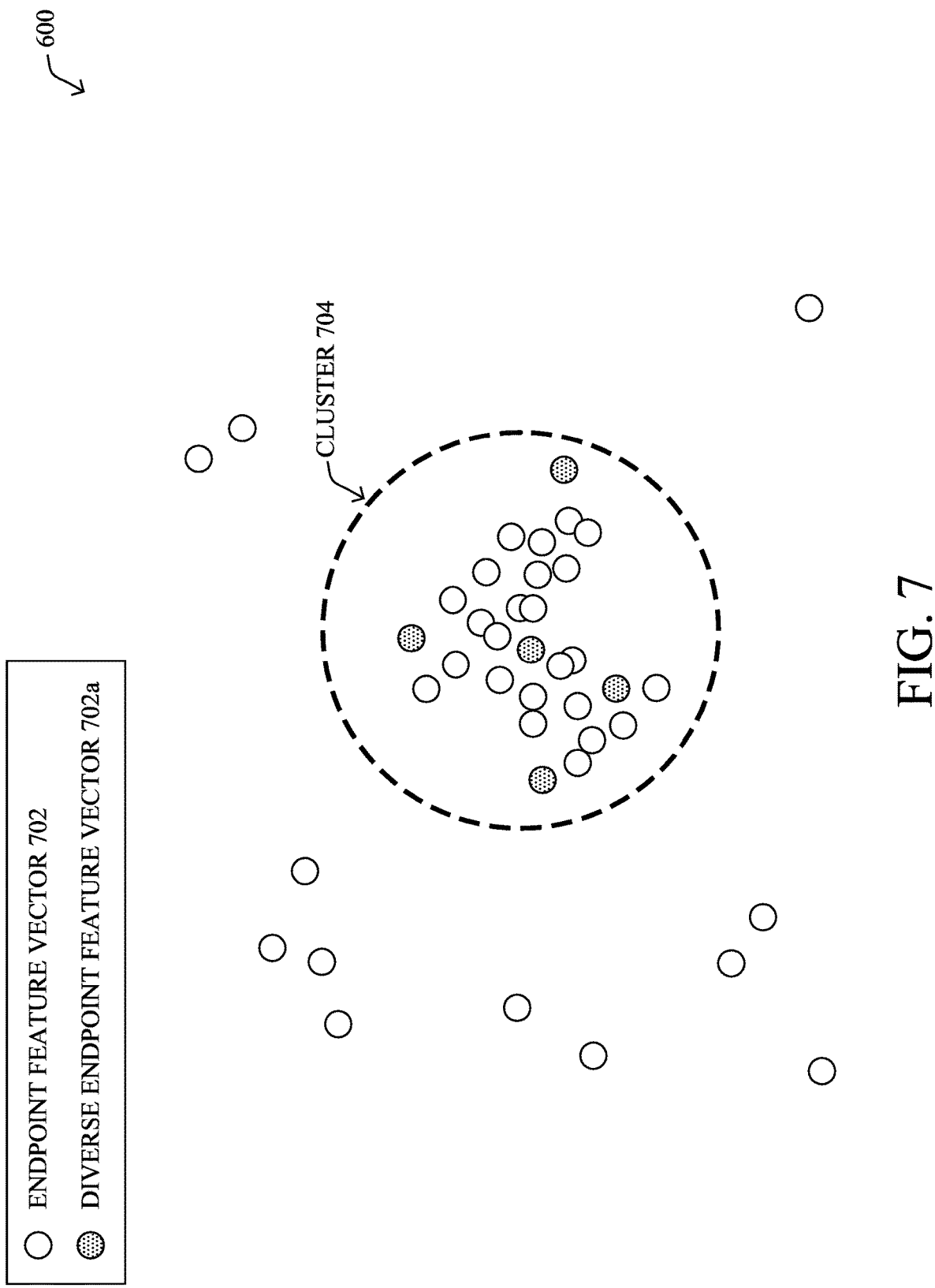
FIG. 7 illustrates an example of selecting a subset of endpoint devices from a cluster.

FIG. 7 illustrates an example 700 of selecting a subset of endpoint devices from a cluster. As would be appreciated, example 700 is an extremely simplified example whereby endpoint feature vectors 702 are two dimensional. Although the notion may seem simple in this special case, in practice, the feature representation used may be of very high dimensionality, or even infinite dimension, if kernel techniques are used.

Assume that some of endpoint feature vectors 702 are relatively close to one another in the feature space and are clustered together by a machine learning-based clustering process (e.g., of device classification process 248 in FIG. 5) as part of cluster 704. In other words, the observed traffic features and/or other characteristics of the endpoint feature vectors 702 within cluster 704 are very similar to one another.

The cluster analyzer analyzing the feature data of cluster 704 may select any desired number of diverse feature vectors 702 as a subset of cluster 704 and, correspondingly, their associated endpoint devices. For example, assume that the number of diverse endpoints for selection is set at five. In such a case, as shown, the cluster analyzer may select the endpoint feature vectors 702a as a subset of cluster 704, in an attempt to maximize the diversity of the subset. In other words, the selected feature vectors 702a, and their corresponding endpoint devices, may exhibit the most diverse behaviors from within cluster 704. Note also that the number of selected endpoint devices/feature vectors selected for inclusion in a given subset of a cluster can be adjusted dynamically, based on the variability in the cluster.

Referring again to FIG. 5, labeling process 249 may also include device behavior controller 504 that receives the selected subset of endpoint devices/feature vectors from cluster analyzer 502. In various embodiments, device behavior controller may be configured to trigger different conditions for endpoint devices 510, to force them to exhibit finer network behaviors. More specifically, for the subset of the cluster selected by cluster analyzer 502, device behavior controller 504 may attempt to elicit additional behaviors from those endpoint devices, so as to obtain additional features.

During execution, device behavior controller may utilize a library of actions or conditions to simulate or trigger specified behaviors on the endpoint devices 510 in the subset of the cluster. To do so, device behavior controller 504 may send one or more control commands 522 to the target endpoint devices 510 and/or to the networking devices 512 in communication with the endpoint devices 510. Device behavior controller 504 may elicit the behaviors either in order, according to the library, randomly, or according to a set decision tree provided by a subject matter expert via user interface 508.

In various embodiments, control command(s) 522 may cause the performance of any or all of the following:

Port scans and/or triggering connections on open ports—This may reveal information about what services and servers the target endpoint device 510 is running. Connecting to open ports may reveal information about the services themselves (e.g., through banners or software versions). Unlike port scans that may sometimes be triggered by device classification process 248, a more thorough port scan can be triggered by control commands 522, as only a very limited set of endpoint devices 510 are considered.

Application specific recipes—Extending on the previous examples, the library of device behavior controller 504 may include specific drivers for known protocols that actually know how to connect to specific services and can be used to issue control command(s) 522. This can allow for the collection of more information that only banners.

On-the-fly deep packet inspection (DPI)—For a short period of time, one or more of networking devices 512 can perform DPI on traffic 514 of the target endpoint devices 510, to analyze the full packet traffic going in and out of these devices. As in the case of port scans, DPI can be used here as it is limited to a very small number of endpoint devices 510.

Finite state machine (FSM) resets—In some cases, control command(s) 522 can trigger the reset of a protocol or application FSM used by the target endpoint devices 510. For example, control command(s) 522 may cause networking devices 512 to send forget RSTs to the endpoint devices 510, to terminate their active flows. This may force the affected endpoint devices 510 to re-establish connections, revealing information about their underlying FSMs.

Applying specific QoS or security policies to the endpoint devices—For instance, control command(s) 522 may cause networking devices 512 to deny all DNS traffic of the target endpoint devices 510, deny all HTTP traffic of the devices, throttle the network throughput of the devices, randomly drop a fraction of the traffic 514 of the devices, etc. This may reveal information about how the devices 510 handle failures and retries in the light of network failures.

Hijack some of the incoming traffic and corrupt some of the packets—Control command(s) 522 can also cause networking devices 512 to hijack and corrupt some of the packets of traffic 514 associated with the selected endpoint devices 510 from the cluster. This can be at the level of flags in the packet, or in the contents directly. Note that this is one of the most intrusive methods in this list of examples.

Limiting options during onboarding—Control command(s) 522 may also cause networking devices 512 to limit their support for certain protocols for wireless and/or authentication, to very restricted sets.

As would be appreciated, any of the above actions will cause the endpoint devices 510 in the subset of the cluster under analysis to exhibit additional behaviors in the network. Consequently, networking devices 512 may capture updated telemetry data 516 that includes the additional features from the triggered behaviors, which can then be passed to cluster analyzer 502 as part of updated cluster feature data 520.

In various embodiments, cluster analyzer 502 may use the updated cluster feature data 520 for the selected endpoint devices 510 in the subset of the cluster under scrutiny, to decide whether cluster labeler 506 should or should not send a label request 510 to user interface 508 for the cluster.

Indeed, if the updated feature data would not cause a split in the cluster, labeling of the cluster can proceed, and cluster labeler 506 may send label request 510 to user interface 508. However, it may also be the case that the additional features collected as a result of device behavior controller 504 triggering certain endpoint behaviors changes how the endpoint devices/feature vectors in the cluster would be clustered. For example, with the additional features filled in for a certain endpoint device 510, it may no longer appear behaviorally similar to the other devices in the cluster, thereby causing a split in the cluster into multiple subgroups. In such cases, cluster analyzer 502 may prevent cluster labeler 506 from sending label request 510 to user interface 508 for that cluster. In some embodiments, cluster analyzer 502 may also flag the cluster under analysis for further review by the engineering team responsible for device classification process 248, to allow them to assess how to better differentiate devices in further releases.

Figure 8:
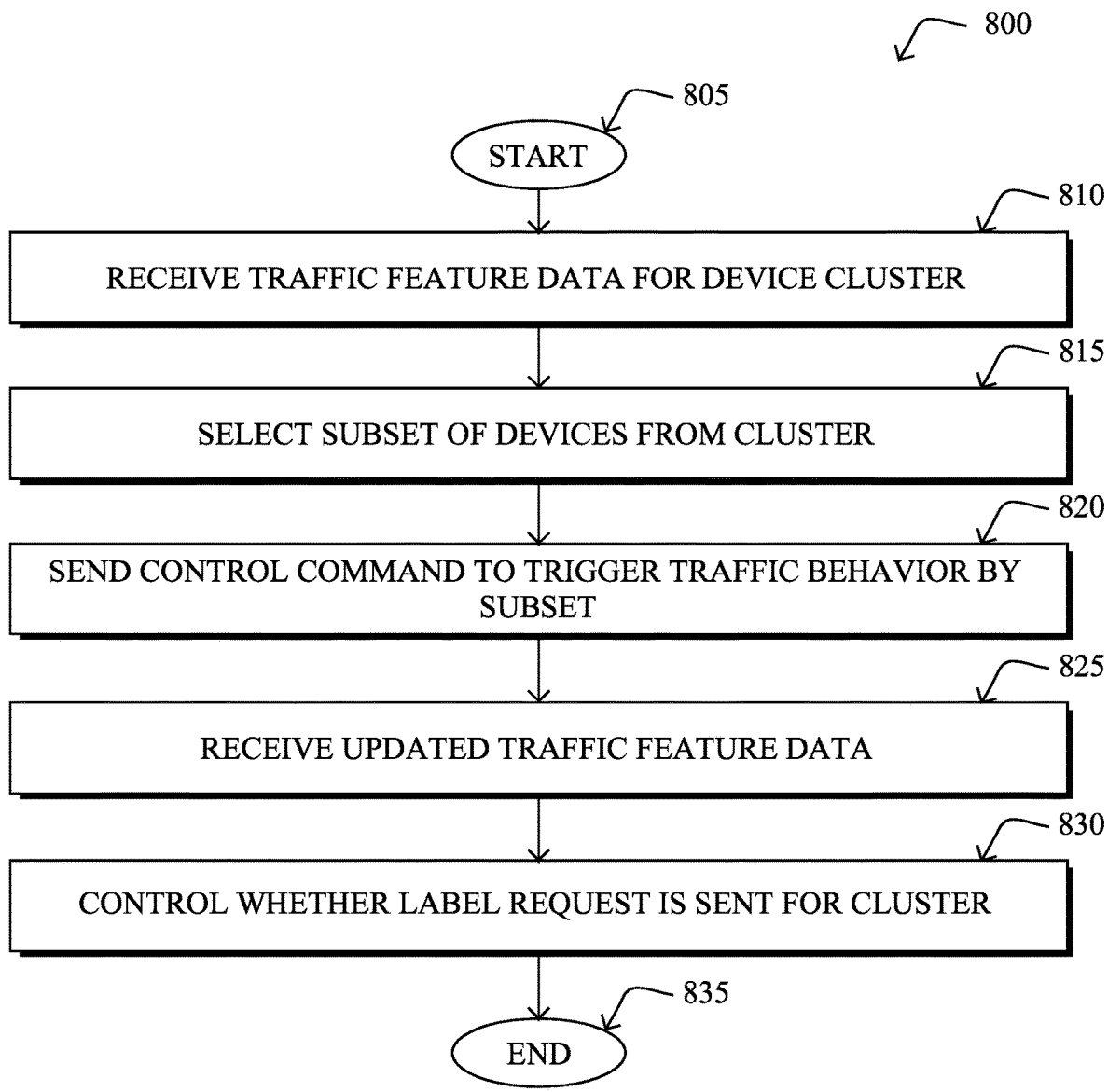
FIG. 8 illustrates an example simplified procedure for differentiating devices with similar network footprints using active techniques.

FIG. 8 illustrates an example simplified procedure for differentiating devices with similar network footprints using active techniques, in accordance with one or more embodiments described herein. For example, a non-generic, specifically configured device (e.g., device 200) may perform procedure 800 by executing stored instructions (e.g., process 248), to provide a labeling service that operates in conjunction with a device classification service. The procedure 800 may start at step 805, and continues to step 810, where, as described in greater detail above, the labeling service may receive traffic feature data for a cluster of endpoint devices in a network. In various embodiments, the device classification service may form the cluster of endpoint devices by applying machine learning-based clustering to the traffic feature data. For example, the traffic feature data may take the form of feature vectors having entries that signify the presence or absence of certain protocols within the traffic of the endpoint devices.

At step 815, as detailed above, the labeling service may select a subset of the endpoint devices in the cluster, in an effort to maximize diversity of the traffic feature data of the selected endpoint devices. The service may use any number of different selection strategies such as, but not limited to, greedy selection of the endpoint devices/feature vectors in the cluster farthest away from all previously selected endpoint devices/feature vectors, probabilistic point processes, or dynamic methods (e.g., k-medoid clustering, etc.).

At step 820, the labeling service may send a control command into the network, to trigger a traffic behavior by the selected subset of the endpoint devices in the cluster, as described in greater detail above. In various embodiments, the control command may cause one or more networking devices in the network to perform deep packet inspection of traffic associated with the selected subset of the endpoint devices, drop at least a portion of traffic associated with the selected subset of the endpoint devices, limit network onboarding options for the selected subset of endpoint devices, corrupt traffic packets associated with the selected subset of the endpoint devices, cause finite state machine resets for the selected subset of endpoint devices, perform a port scan of the selected subset of the endpoint devices, connect to open ports of the selected subset of the endpoint devices, or initiate an application-specific behavior by the selected subset of endpoint devices.

At step 825, as detailed above, the labeling service may receive updated traffic feature data for the selected subset of endpoint devices in the cluster associated with the triggered traffic behavior. Notably, the behavior(s) triggered by the control command of step 820 may result in the collection of additional features/data points regarding the selected subset of endpoint devices in the cluster.

At step 830, the labeling service may control whether a label request is sent to a user interface for labeling of the cluster of endpoint devices with a device type, as described in greater detail above. Notably, the service may control the sending of a labeling request for the cluster, based on the updated traffic feature data for the subset of endpoint devices in the cluster. If, for example, the labeling service determines that the updated traffic feature data does not cause a split in the cluster, it may send the label request to the user interface for the cluster. Conversely, if the labeling service determines that the updated traffic feature data would cause a split in the cluster, it may prevent the label request from being sent. Procedure 800 then ends at step 835.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for active learning of device labels for use by a machine learning-based device type classifier. In some aspects, the techniques herein help to refine which device clusters are sent for labeling, by triggering additional behaviors by a subset of the endpoint devices in the cluster and assessing the resulting telemetry data.

While there have been shown and described illustrative embodiments that provide for differentiating devices with similar network footprints using active learning techniques, it is to be understood that various other adaptations and modifications may be made within the spirit and scope of the embodiments herein. For example, while certain embodiments are described herein with respect to using certain models for purposes of device type classification, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   receiving, at a labeling service, traffic feature data for a cluster of endpoint devices in a network, wherein a device classification service forms the cluster of endpoint devices by applying machine learning-based clustering to the traffic feature data;

selecting, by the labeling service, a subset of the endpoint devices in the cluster, in an effort to maximize diversity of the traffic feature data of the selected subset of endpoint devices;

sending, by the labeling service, a control command into the network, to trigger a traffic behavior by the selected subset of the endpoint devices in the cluster;

receiving, at the labeling service, updated traffic feature data for the selected subset of endpoint devices in the cluster associated with the triggered traffic behavior; and controlling, by the labeling service, whether a label request is sent to a user interface for labeling of the cluster of endpoint devices with a device type, based on the updated traffic feature data for the subset of endpoint devices in the cluster.

2. The method as in claim 1, wherein the traffic feature data comprises traffic feature vectors, wherein an entry in a traffic feature vector for one of the endpoint devices indicates the presence or absence of a particular traffic feature in traffic observed in the network for that endpoint device.

3. The method as in claim 1, wherein controlling whether a label request is sent to a user interface for labeling of the cluster of endpoint devices with a device type, based on the updated traffic feature data for the subset of endpoint devices in the cluster, comprises:

sending a label request to the user interface for labeling that includes the updated traffic feature data for the subset of endpoint devices, based on a determination that the updated traffic feature data does not cause a split in the cluster.

4. The method as in claim 3, further comprising:

receiving a device type label for the cluster of endpoint devices from the user interface, wherein the device classification service applies the device type label to a new endpoint device in the network that has similar traffic feature data as that of the endpoint devices in the cluster.

5. The method as in claim 1, wherein controlling whether a label request is sent to a user interface for labeling of the cluster of endpoint devices with a device type, based on the updated traffic feature data for the subset of endpoint devices in the cluster, comprises:

determining that the updated traffic feature data would cause the machine learning-based clustering of the endpoint devices to split the cluster; and preventing the label request from being sent to the user interface based on the determination that the updated traffic feature data would cause the machine learning-based clustering of the endpoint devices to split the cluster.

6. The method as in claim 5, further comprising:

flagging the cluster for review, based on the determination that the updated traffic feature data would cause the machine learning-based clustering of the endpoint devices to split the cluster.

7. The method as in claim 1, wherein the control command causes one or more networking devices in the network to perform at least one of: initiating a port scan of the selected subset of the endpoint devices, connecting to open ports of the selected subset of the endpoint devices, or initiate an application-specific behavior by the selected subset of endpoint devices.

8. The method as in claim 1, wherein the control command causes one or more networking devices in the network to perform at least one of: dropping at least a portion of traffic associated with the selected subset of the endpoint devices, limiting network onboarding options for the selected subset of endpoint devices, corrupting traffic packets associated with the selected subset of the endpoint devices, or causing finite state machine resets for the selected subset of endpoint devices.

9. The method as in claim 1, wherein the control command causes one or more networking devices in the network to perform deep packet inspection of traffic associated with the selected subset of the endpoint devices.

10. An apparatus, comprising:

one or more network interfaces to communicate with a network;

a processor coupled to the network interfaces and configured to execute one or more processes; and a memory configured to store a process executable by the processor, the process when executed configured to:

receive traffic feature data for a cluster of endpoint devices in a network, wherein a device classification service forms the cluster of endpoint devices by applying machine learning-based clustering to the traffic feature data;

select a subset of the endpoint devices in the cluster, in an effort to maximize diversity of the traffic feature data of the selected subset of endpoint devices;

send a control command into the network, to trigger a traffic behavior by the selected subset of the endpoint devices in the cluster;

receive updated traffic feature data for the selected subset of endpoint devices in the cluster associated with the triggered traffic behavior; and control whether a label request is sent to a user interface for labeling of the cluster of endpoint devices with a device type, based on the updated traffic feature data for the subset of endpoint devices in the cluster.

11. The apparatus as in claim 10, wherein the traffic feature data comprises traffic feature vectors, wherein an entry in a traffic feature vector for one of the endpoint devices indicates the presence or absence of a particular traffic feature in traffic observed in the network for that endpoint device.

12. The apparatus as in claim 10, wherein the apparatus controls whether a label request is sent to a user interface for labeling of the cluster of endpoint devices with a device type, based on the updated traffic feature data for the subset of endpoint devices in the cluster, by:

sending a label request to the user interface for labeling that includes the updated traffic feature data for the subset of endpoint devices, based on a determination that the updated traffic feature data does not cause a split in the cluster.

13. The apparatus as in claim 12, wherein the process when executed is further configured to:

receive a device type label for the cluster of endpoint devices from the user interface, wherein the device classification service applies the device type label to a new endpoint device in the network that has similar traffic feature data as that of the endpoint devices in the cluster.

14. The apparatus as in claim 10, wherein the apparatus controls whether a label request is sent to a user interface for labeling of the cluster of endpoint devices with a device type, based on the updated traffic feature data for the subset of endpoint devices in the cluster, by:

determining that the updated traffic feature data would cause the machine learning-based clustering of the endpoint devices to split the cluster; and preventing the label request from being sent to the user interface based on the determination that the updated traffic feature data would cause the machine learning-based clustering of the endpoint devices to split the cluster.

15. The apparatus as in claim 14, wherein the process when executed is further configured to:
flag the cluster for review, based on the determination that the updated traffic feature data would cause the machine learning-based clustering of the endpoint devices to split the cluster.

16. The apparatus as in claim 10, wherein the control command causes one or more networking devices in the network to perform at least one of: initiating a port scan of the selected subset of the endpoint devices, connecting to open ports of the selected subset of the endpoint devices, or initiate an application-specific behavior by the selected subset of endpoint devices.

17. The apparatus as in claim 10, wherein the control command causes one or more networking devices in the network to perform at least one of: dropping at least a portion of traffic associated with the selected subset of the endpoint devices, limiting network onboarding options for the selected subset of endpoint devices, corrupting traffic packets associated with the selected subset of the endpoint devices, or causing finite state machine resets for the selected subset of endpoint devices.

18. The apparatus as in claim 10, wherein the control command causes one or more networking devices in the network to perform deep packet inspection of traffic associated with the selected subset of the endpoint devices.

19. A tangible, non-transitory, computer-readable medium storing program instructions that cause a labeling service to execute a process comprising:
receiving, at a labeling service, traffic feature data for a cluster of endpoint devices in a network, wherein a device classification service forms the cluster of endpoint devices by applying machine learning-based clustering to the traffic feature data;
selecting, by the labeling service, a subset of the endpoint devices in the cluster, in an effort to maximize diversity of the traffic feature data of the selected subset of endpoint devices;
sending, by the labeling service, a control command into the network, to trigger a traffic behavior by the selected subset of the endpoint devices in the cluster;
receiving, at the labeling service, updated traffic feature data for the selected subset of endpoint devices in the cluster associated with the triggered traffic behavior; and
controlling, by the labeling service, whether a label request is sent to a user interface for labeling of the cluster of endpoint devices with a device type, based on the updated traffic feature data for the subset of endpoint devices in the cluster.

20. The tangible, non-transitory, computer readable medium as in claim 19, wherein controlling whether a label request is sent to a user interface for labeling of the cluster of endpoint devices with a device type, based on the updated traffic feature data for the subset of endpoint devices in the cluster, comprises:
determining that the updated traffic feature data would cause the machine learning-based clustering of the endpoint devices to split the cluster; and
preventing the label request from being sent to the user interface based on the determination that the updated traffic feature data would cause the machine learning-based clustering of the endpoint devices to split the cluster.

* * * * *